US012239050B2

(12) United States Patent
Frenzel et al.

(10) Patent No.: US 12,239,050 B2
(45) Date of Patent: Mar. 4, 2025

(54) CONDITIONING ROLLER ASSEMBLY PIVOTABLE TO OPEN POSITION FOR SERVICING

(71) Applicant: DEERE & COMPANY, Moline, IL (US)

(72) Inventors: Maximilian Frenzel, Muenchweiler an der Rodalb (DE); Stefan Gross, Riegelsberg (DE); Manfred Engel, Grosssteinhausen (DE); Alexander Guth, Konken (DE)

(73) Assignee: DEERE & COMPANY, Moline, IL (US)

( * ) Notice: Subject to any disclaimer, the term of this patent is extended or adjusted under 35 U.S.C. 154(b) by 500 days.

(21) Appl. No.: 17/653,223

(22) Filed: Mar. 2, 2022

(65) Prior Publication Data

US 2022/0279721 A1 Sep. 8, 2022

(30) Foreign Application Priority Data

Mar. 2, 2021 (DE) .......................... 102021104994.6

(51) Int. Cl.
*A01D 43/10* (2006.01)
*A01D 43/08* (2006.01)
*A01D 82/02* (2006.01)

(52) U.S. Cl.
CPC ......... *A01D 43/107* (2013.01); *A01D 43/088* (2013.01); *A01D 82/02* (2013.01)

(58) Field of Classification Search
CPC ..... A01D 43/107; A01D 82/02; A01D 43/088
See application file for complete search history.

(56) References Cited

U.S. PATENT DOCUMENTS

| 7,681,384 B2 | 3/2010 | Scherer | |
|---|---|---|---|
| 11,825,769 B2 | 11/2023 | Gross et al. | |
| 2004/0261388 A1* | 12/2004 | Scherer | A01D 82/00 56/16.4 R |
| 2017/0246640 A1* | 8/2017 | Wagner | B02C 21/02 |
| 2019/0124851 A1* | 5/2019 | Ingram | A01G 3/00 |
| 2020/0323137 A1* | 10/2020 | Bode Mortensen | A01D 82/02 |
| 2022/0132744 A1* | 5/2022 | Turatti | B02C 18/145 241/47 |

FOREIGN PATENT DOCUMENTS

| DE | 102019215028 A1 | 4/2021 |
|---|---|---|
| EP | 2098110 A2 | 9/2009 |
| EP | 2363016 A1 | 9/2011 |
| EP | 2364586 A1 | 9/2011 |
| EP | 2532222 A1 | 12/2012 |
| WO | WO2012010396 A1 | 1/2012 |

* cited by examiner

*Primary Examiner* — Alicia Torres
*Assistant Examiner* — Julia C Tran

(57) ABSTRACT

A conditioning roller assembly includes a first conditioning roller which is rotatably mounted on a first holder, a second conditioning roller which is rotatably mounted on a second holder, and a pivoting arrangement which includes a first component and a second component which are connected together by a hinge with an axis extending parallel to the longitudinal axes of the conditioning rollers, and a resilient arrangement for providing pre-tensioning of the conditioning rollers. The first holder and/or the second holder is mounted so as to be pivotable in each case about a pivot axis relative to the associated first component and/or second component for servicing purposes.

6 Claims, 3 Drawing Sheets

CONDITIONING ROLLER ASSEMBLY PIVOTABLE TO OPEN POSITION FOR SERVICING

CROSS-REFERENCE TO RELATED APPLICATIONS

This application claims the benefit of German Patent Application No. 102021104994.6, filed on Mar. 2, 2021, the disclosure of which is hereby incorporated by reference.

TECHNICAL FIELD

The disclosure generally relates to a conditioning roller assembly for a harvester implement.

BACKGROUND

Forage harvesters are used to harvest whole plants or parts thereof, which, during operation, are picked up from a field by means of a harvesting attachment, are compressed by pre-compression rollers and are supplied to a blade drum, the chopping blades of which chop up the plants in cooperation with a counter-blade. Subsequently, the chopped-up plants or plant parts are optionally supplied to a conditioning roller assembly and conveyed by a post-accelerating device into a discharge spout which loads them onto a transport vehicle. The harvested plants generally serve as cattle fodder or for biogas production. The conditioning roller assembly comprises two or more conditioning rollers which are driven in opposite directions, which are mounted so as to be movable relative to one another, which are pretensioned relative to one another by a force, and between which the chopped crops are passed. The conditioning roller assembly is used in corn harvesting in order to pound the grains contained in the chopped crops and to improve the digestibility of the fodder.

The conditioning roller assembly may include a pivoting arrangement constructed from two components. A roller is rotatably supported on each component. The components of the pivoting arrangement are pivotable relative to one another about an axis extending parallel to the longitudinal axis of the conditioning rollers and are pretensioned relative to one another by springs (EP 2098110 A2) or hydraulic cylinders (WO 2012/010396 A1).

In other embodiments, one roller may be mounted so as to be displaceable in a linear manner relative to the other roller (U.S. Pat. No. 7,681,384 B2, EP 2532222 A1). The displaceable arrangements of the conditioning rollers make it possible to fold up one of the components after the conditioning roller assembly has been dismantled from the forage harvester for the purpose of replacing or servicing the conditioning rollers, but have the drawback that a linear displacement may easily result in the movable roller tilting when the throughput of material is not uniform across the width of the conditioning roller assembly. Moreover, the linear displaceability is more difficult to implement structurally than rotatable mounting of the components of the conditioning roller assembly.

In conditioning roller assemblies with components that are arranged in a pivotable manner relative to one another, a roller has to be dismantled in each case from a component for servicing and replacement purposes. In the case of the conditioning roller assembly shown in EP 2098110 A2, which is considered to be generic, this is possible in a relatively simple manner in the case of one of the conditioning rollers, since this roller can, after four screw connections have been released, be separated from its component together with the associated bearing assemblies and a cover of the conditioning roller. However, in the case of the other conditioning roller, the ends of which extend through holes in side walls of the other component, to the outer side of which the bearing is attached, first of all both components, including the spring and the rotary bearing, have to be dismantled before the conditioning roller can be removed, this proving to be quite time-consuming. Subsequent assembly is similarly complex. The subsequently published document DE 102019215028 A1 proposes, in order to simplify dismantling of the conditioning roller assembly, also attaching the second conditioning roller to a separate holder, which can be unscrewed from its associated component.

Accordingly, it would be desirable to improve a conditioning roller assembly of the type mentioned at the beginning in such a way that dismantling and mounting of the conditioning rollers is simplified.

SUMMARY

A conditioning roller assembly for attaching to a forage harvester is provided. The conditioning roller may include a first conditioning roller which is rotatably mounted on a first holder by a first bearing arrangement, a second conditioning roller which is rotatably mounted on a second holder by a second bearing arrangement, and a pivoting arrangement which comprises a first component and a second component which are connected together by a hinge with an axis extending parallel to the longitudinal axes of the conditioning rollers and a resilient arrangement for providing pretensioning of the conditioning rollers. The first holder is fastened to the first component and the second holder is fastened to the second component. The first component and second component, with the holders and conditioning rollers respectively attached thereto, can move apart during operation about the axis of rotation formed by the hinge, counter to the force of the resilient arrangement, depending on a throughput of harvested material passing through the gap between the conditioning rollers. The first holder and/or the second holder is mounted so as to be pivotable about a pivot axis relative to the associated first and/or second component for servicing purposes.

In other words, in a conditioning roller assembly which includes a pivoting arrangement made up of two components that are movable during operation about a hinge axis relative to one another and are pretensioned relative to one another, the first holder with the first conditioning roller is mounted on the first component of the pivoting arrangement and/or the second holder with the second conditioning roller is mounted on the second component of the pivoting arrangement. As a result, the dismantling and mounting of the conditioning roller(s) is substantially simplified.

In particular, the pivot axis extends parallel to the axis of the hinge and to the axis of rotation and longitudinal axis of the conditioning roller.

In one implementation, the first holder and/or the second holder is mounted so as to be pivotable about the pivot axis between an operating position and an opening position, in which the conditioning roller is able to be dismantled from the holder and is removable from the conditioning roller assembly.

The above features and advantages and other features and advantages of the present teachings are readily apparent

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
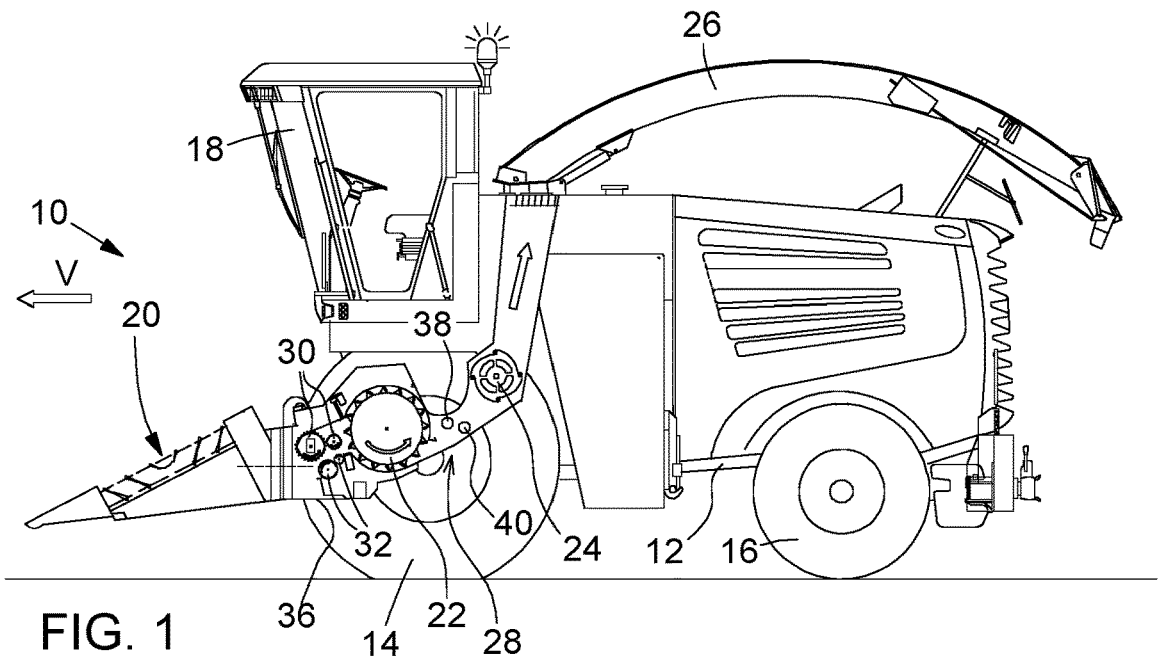
FIG. 1 is a schematic side view of a forage harvester.

Referring to the Figures, wherein like numerals indicate like parts throughout the several views, a self-propelled forage harvester is generally shown at 10 in FIG. 1. The self-propelled forage harvester 10 is constructed on a frame 12 which is carried by driven front wheels 14 and steerable rear wheels 16. The forage harvester 10 is operated from a driver's cab 18 from which a harvesting attachment 20 suitable for harvesting stalk-like plants is observable. By means of the harvesting attachment 20, which is a corn header that works in a row-independent manner in the embodiment shown, material picked up from the ground, for example corn, cereals or the like, is supplied by upper pre-compression rollers 30 and lower pre-compression rollers 32 arranged in a feeder assembly 36 to a chopping drum 22, which chops it into small pieces and dispenses it to a conveying device 24. The material passes from the forage harvester 10 to a trailer travelling alongside via a discharge device 26 which is adjustable in terms of its position. A conditioning roller assembly 28, by way of which the material to be conveyed is supplied tangentially to the conveying device 24, extends between the chopping drum 22 and the conveying device 24. In the following text, directional information such as front, rear, left and right is, unless stated otherwise, in relation to the forward direction V of the forage harvester 10, which goes from right to left in FIG. 1.

The conditioning roller assembly 28 is shown in FIGS. 2 to 6. The conditioning roller assembly 28 includes a first conditioning roller 38 and a second conditioning roller 40, which cooperate with one another during a harvesting operation in order to crush or fracture the grains contained in the chopped harvested material. The conditioning rollers 38, 40 are driven via pulleys 42, 44 which are driven via a belt (not shown) by a pulley connected to the shaft of the conveying device 24. The pulley 44 is smooth since it cooperates with the rear face of the belt during operation. The shaft of the conveying device 24 is driven in a manner known per se by a belt drive which also connects to an internal combustion engine of the forage harvester 10 and a shaft of the chopping drum 22. The belt that serves to drive the conditioning rollers 38, 40 is tensioned in a manner known per se, to which end a freely running roller (not shown) or a deflection roller (not shown) fastened to the conditioning roller assembly can be used. It may also be conceivable to exchange the relative positions of the conditioning rollers 38, 40 in FIG. 1.

Figure 2:
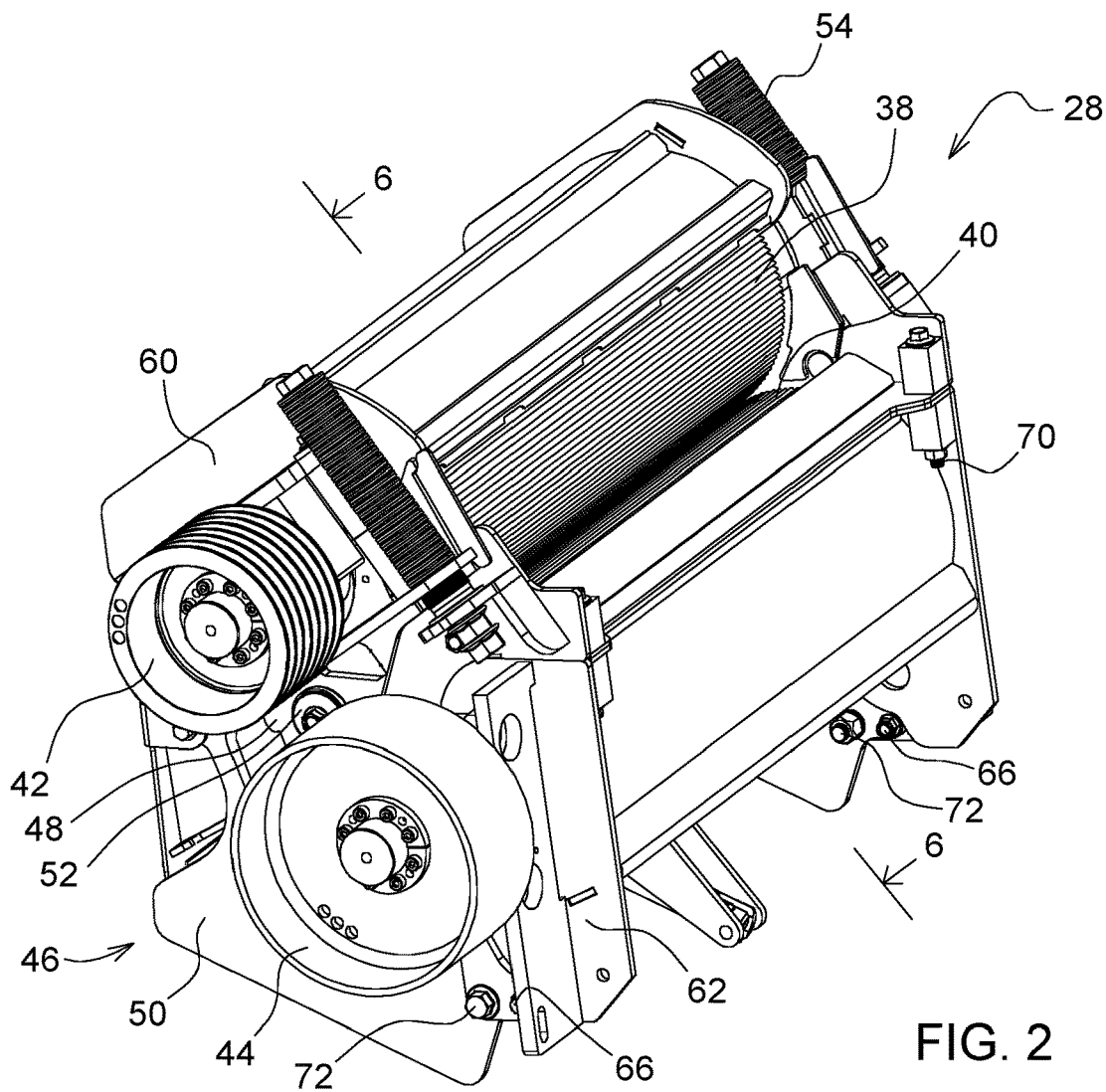
FIG. 2 is a schematic perspective view from above of a conditioning roller assembly in a mounted state.
Figure 3:
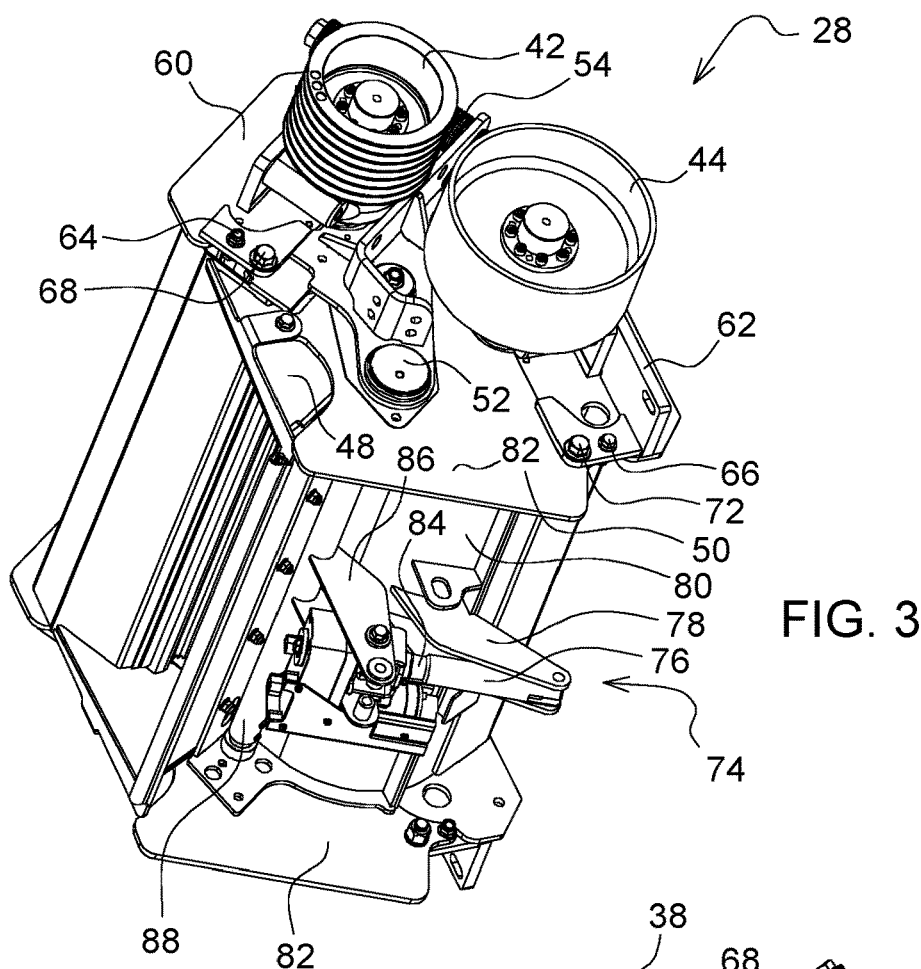
FIG. 3 is a schematic perspective view from below of the conditioning roller assembly in the mounted state.
Figure 4:
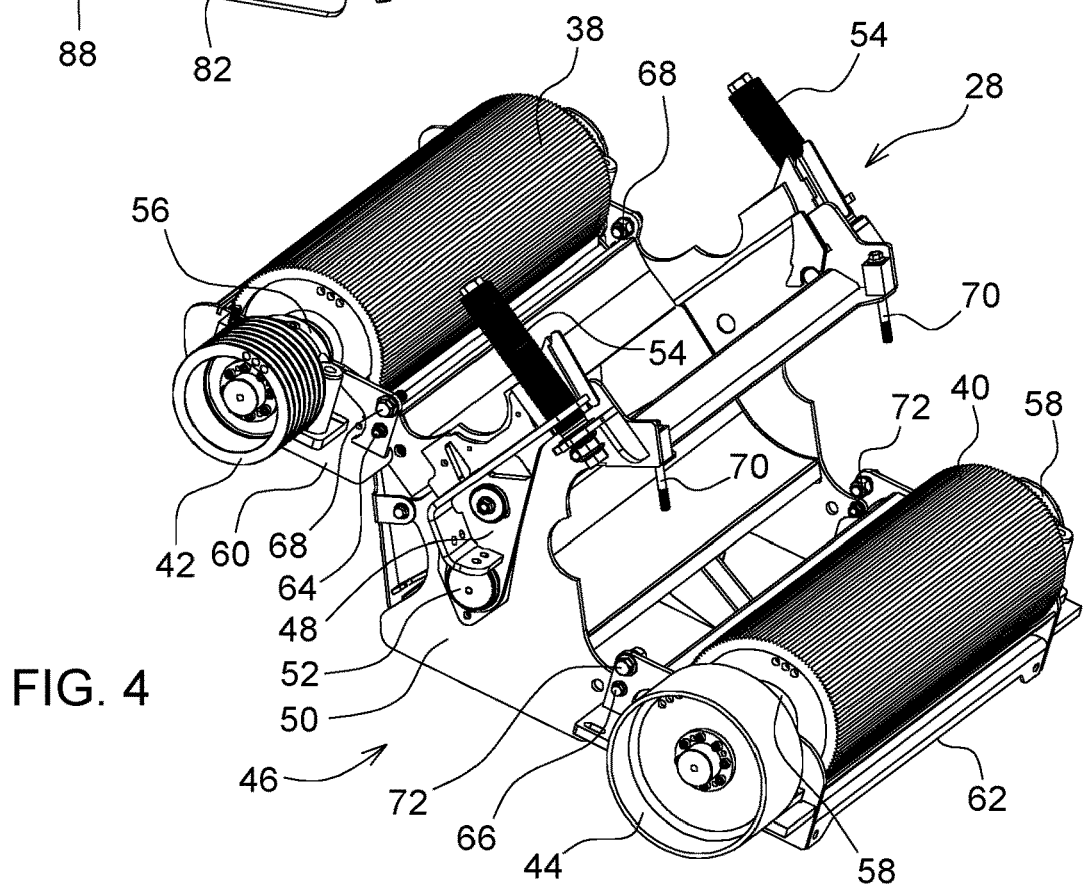
FIG. 4 is a schematic perspective view from above of the conditioning roller assembly in a folded-up state.
Figure 5:
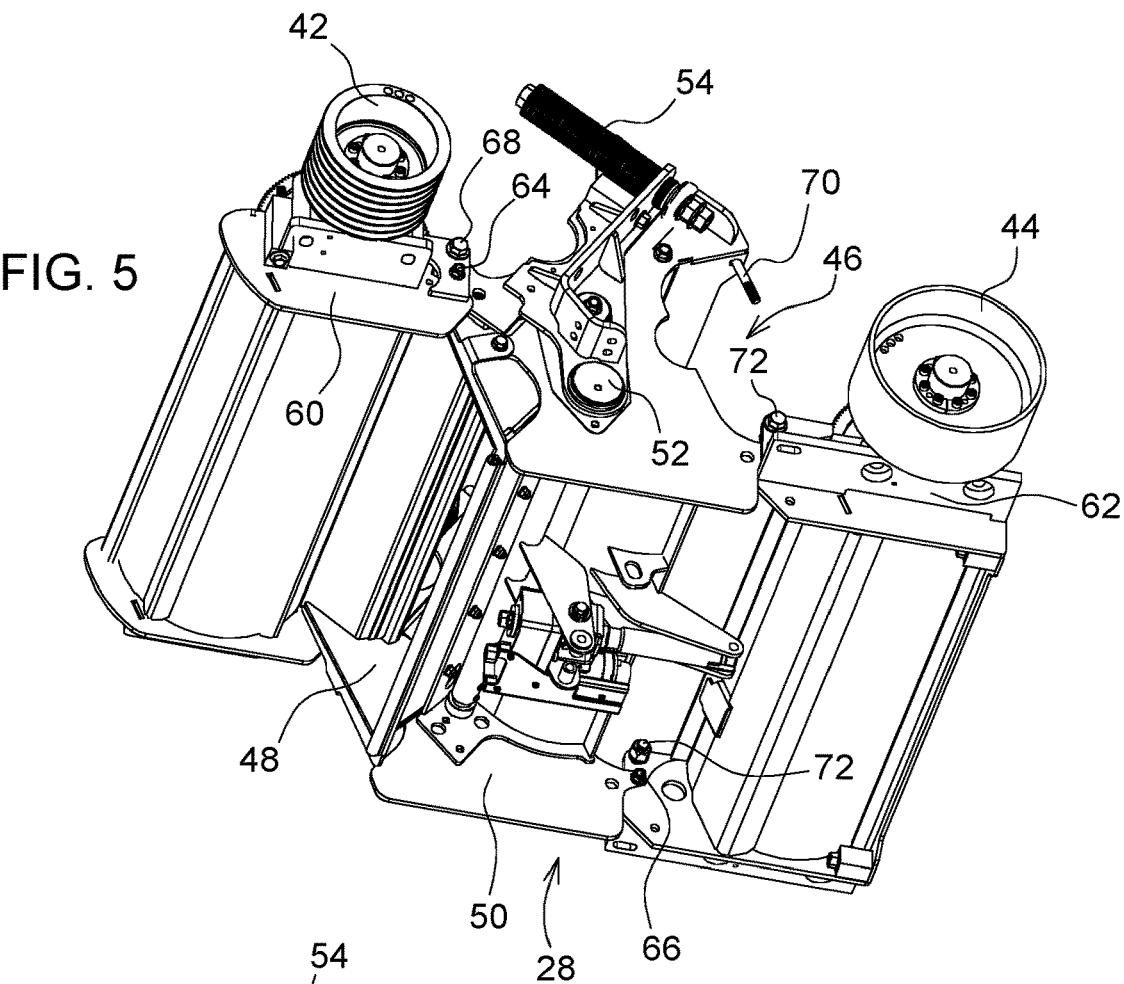
FIG. 5 is a schematic perspective view from below of the conditioning roller assembly in the folded-up state.

The conditioning roller assembly 28 includes, as is most clearly apparent from viewing FIGS. 2 to 5 together, wherein FIGS. 2 and 3 show it in the operational state and FIGS. 4 and 5 show it in the folded-up state for servicing and repair purposes, a pivoting arrangement 46, which is made up of a first component 48 and a second component 50. The first component 48 is provided with an opening which encloses a circular eccentric 52 such that the first component 48 is thus rotatable relative to the eccentric 52 about a hinge having an axis that extends parallel to the longitudinal axis of the conditioning rollers 38, 40. The eccentric 52 is, for its part, connected to the second component 50 for conjoint rotation but, as described below, so as to be adjustable by an actuator. A resilient arrangement 54 having a number of cup springs pretensions the first component 48 relative to the second component 50 at a distance from the eccentric 52, such that the two components 48, 50 can rotate about said axis when harvested material passes between the conditioning rollers 38, 40.

The mechanical structure of the first and second component 48, 50 corresponds substantially to the structure according to EP 2098110 A2, the disclosure of which is included in the present documents by reference, with the main difference that the bearing arrangements 56, 58 of the conditioning rollers 38, 40 are not fastened directly to the components 48, 50 of the pivoting arrangement 46 but to holders 60, 62 which are separate therefrom and, for their part, for servicing and repair purposes, are fastened in a movable manner to the respective components 48 and 50 of the pivoting arrangement 46 about pivot axes 64, 66 which, in the embodiment shown, are each formed by screws. The pivot axes 64, 66 are each oriented parallel to the longitudinal axes of the conditioning rollers 38, 40 and to the axis of the hinge of the pivoting arrangement 46.

In the operating state, as is shown in FIGS. 2 and 3, the holders 60, 62 are fastened to the associated components 48 and 50 by pins 68 or, respectively, 70 and 72, which extend, at a distance from the pivot axes 64, 66, through appropriate openings or bores in the first holder 60 and in the first component 48 or, respectively, in the second holder 62 or in the second component 50. After the pins 68, 70, 72, which can be embodied in particular as bolts, have been removed, the holders 60, 62 can thus be pivoted from the closed operating position in FIGS. 2 and 3 into the open servicing position in FIGS. 4 and 5. Access to the conditioning rollers 38, 40 and their bearing arrangements 56, 58 is therefore — after the conditioning roller assembly 28 has been dismantled from the forage harvester 10 — quickly and easily possible without the pivoting arrangement 46 needing to be dismantled. Assembly takes place analogously, in the reverse order.

An actuator unit 74 for adjusting the eccentric 52 comprises a linearly variable-length actuating motor 76, the housing of which is connected via an arm 78 to a cover 80 which extends between two lateral side walls 82 of the second component 50 and encloses the second conditioning roller 40. The movable output 84 of the actuating motor 76 is connected to a lever 86 which is coupled to a shaft 88 extending transversely between the side walls 82 of the second component 50. The shaft 88 is, for the one part, mounted on the side walls 82 so as to be rotatable about its longitudinal axis and, for the other part, connected to the eccentrics 52, which are each located in a corresponding opening in the side wall of the first component 48. As a result, adjustment of the smallest possible gap between the conditioning rollers 38, 40 is possible and the abovementioned rotation of the second component 50 relative to the first component 48 about the axis that extends parallel to the axis of the conditioning rollers 38, 40 is possible, since the eccentric 52 forms, with the opening, the hinge about which the components 48, 50 are rotatable relative to one another. The actuation of the actuating motor 76 can be carried out by an operator by means of an interface arranged in the cab 18 or by an automated system based on properties of the harvested material that are detected by sensors.

Figure 6:
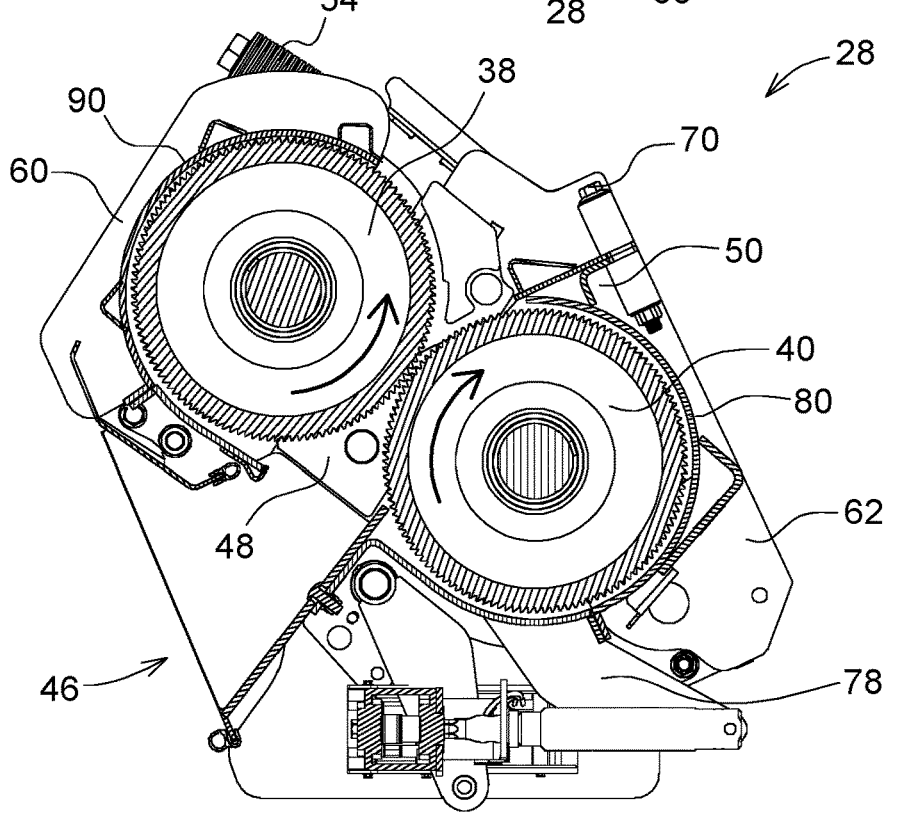
FIG. 6 is a schematic cross-sectional view through the conditioning roller assembly along the cut line 6-6 shown in FIG. 2.

It is apparent from FIG. 6 that the distance between the envelope circle of the first conditioning roller 38 and its cover 90 that encloses it through a region, spaced apart from the conditioning rollers 38, 40, of about 180° increases gradually in the direction of rotation that applies during harvesting operation (indicated by the arrows). This could also be embodied analogously in the case of the second conditioning roller 40 and its cover 80. As a result of this spiral shape, undesired accumulations of harvested material between the conditioning rollers 38, 40 and their covers 90, 80 are avoided.

It should also be noted that, in the embodiment illustrated, both conditioning rollers 38, 40 are attached to a holder 60, 62 that is able to be flapped out into the servicing position relative to the associated component 48, 50 of the pivoting arrangement 46. It would also be possible to attach one of the holders 60, 62 to the pivoting arrangement 46 such that it is not pivotable but removable in any desired manner, for example screw it to the associated component of the pivoting arrangement like the holder of the conditioning roller illustrated on the left in the figure of EP 2098110 A2.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A conditioning roller assembly for a forage harvester, the conditioning roller assembly comprising:
   a first conditioning roller which is rotatably mounted on a first holder by a first bearing arrangement;
   a second conditioning roller which is rotatably mounted on a second holder by a second bearing arrangement;
   a pivoting arrangement which comprises a first component and a second component which are connected together by a hinge with an axis extending parallel to the longitudinal axes of the conditioning rollers, and a resilient arrangement for providing pre-tensioning of the conditioning rollers;
   wherein the first holder is fastened to the first component and the second holder is fastened to the second component;
   wherein the first component and second component, with the holders and conditioning rollers respectively attached thereto, can move apart during operation about the axis of rotation formed by the hinge, counter to the force of the resilient arrangement, depending on a throughput of harvested material passing through the gap between the conditioning rollers; and
   wherein the first holder and/or the second holder are mounted so as to be pivotable in each case about a respective pivot axis relative to the associated first component and second component, without moving the first component or the second component relative to each other, for servicing purposes.

2. The conditioning roller assembly set forth in claim 1, wherein the pivot axis extends parallel to the axis of the hinge and to the axis of rotation and longitudinal axis of the conditioning rollers.

3. The conditioning roller assembly set forth in claim 1, wherein the first holder and the second holder are mounted so as to be pivotable about the pivot axis between an operating position and an opening position, wherein when in the opening position the conditioning rollers are able to be dismantled from the holder and are removable from the conditioning roller assembly.

4. A forage harvester comprising:
   a harvesting attachment configured for gathering crop;
   a chopping drum positioned to receive the crop from the harvesting attachment and configured to chop the crop;
   a conditioning roller assembly positioned to receive the crop from the chopping drum, the conditioning roller assembly including:
   a first conditioning roller which is rotatably mounted on a first holder by a first bearing arrangement;
   a second conditioning roller which is rotatably mounted on a second holder by a second bearing arrangement;
   a pivoting arrangement which comprises a first component and a second component which are connected together by a hinge with an axis extending parallel to the longitudinal axes of the conditioning rollers, and a resilient arrangement for providing pre-tensioning of the conditioning rollers;

wherein the first holder is fastened to the first component and the second holder is fastened to the second component;

wherein the first component and second component, with the holders and conditioning rollers respectively attached thereto, can move apart during operation about the axis of rotation formed by the hinge, counter to the force of the resilient arrangement, depending on a throughput of harvested material passing through the gap between the conditioning rollers; and wherein the first holder and/or the second holder are mounted so as to be pivotable in each case about a respective pivot axis relative to the associated first component and second component, without moving the first component or the second component relative to each other, for servicing purposes.

5. The forage harvester set forth in claim 4, wherein the pivot axis extends parallel to the axis of the hinge and to the axis of rotation and longitudinal axis of the conditioning rollers.

6. The forage harvester set forth in claim 4, wherein the first holder and the second holder are mounted so as to be pivotable about the pivot axis between an operating position and an opening position, wherein when in the opening position the conditioning rollers are able to be dismantled from the holder and are removable from the conditioning roller assembly.

* * * * *